(12) United States Patent
Chakraborty et al.

(10) Patent No.: US 11,722,248 B1
(45) Date of Patent: Aug. 8, 2023

(54) CLOUD COMMUNICATION FOR AN EDGE DEVICE

(71) Applicant: Zurn Industries, LLC, Milwaukee, WI (US)

(72) Inventors: Arindam Chakraborty, Milwaukee, WI (US); Kevin Ferenc, Milwaukee, WI (US); Kevin Brockman, Milwaukee, WI (US)

(73) Assignee: Zurn Industries, LLC, Milwaukee, WI (US)

( * ) Notice: Subject to any disclaimer, the term of this patent is extended or adjusted under 35 U.S.C. 154(b) by 0 days.

(21) Appl. No.: 17/585,422

(22) Filed: Jan. 26, 2022

(51) Int. Cl.
*H04L 1/00* (2006.01)
*H04L 1/08* (2006.01)
*H04L 1/22* (2006.01)

(52) U.S. Cl.
CPC .............. *H04L 1/0061* (2013.01); *H04L 1/08* (2013.01)

(58) Field of Classification Search
None
See application file for complete search history.

(56) References Cited

U.S. PATENT DOCUMENTS

| | | | | |
|---|---|---|---|---|
| 4,908,828 A | * | 3/1990 | Tikalsky | H04L 1/0083 714/822 |
| 5,469,542 A | * | 11/1995 | Foster | G06F 11/2242 709/224 |
| 6,038,232 A | * | 3/2000 | Jung | H04N 21/64307 370/402 |
| 9,071,861 B1 | * | 6/2015 | Beale | H04N 21/816 |
| 11,089,490 B1 | * | 8/2021 | Ta | H04W 24/04 |
| 2002/0141410 A1 | * | 10/2002 | Beshenar | H04L 49/901 370/392 |
| 2002/0152287 A1 | * | 10/2002 | Nakagawa | A61B 6/4494 709/219 |
| 2003/0012198 A1 | * | 1/2003 | Kaganoi | H04L 45/00 370/395.32 |
| 2003/0083851 A1 | * | 5/2003 | Nagamune | G01C 21/3667 702/189 |
| 2003/0191955 A1 | * | 10/2003 | Wagner | G06F 21/572 713/191 |
| 2004/0015767 A1 | * | 1/2004 | Futagi | H04L 1/1812 714/758 |
| 2004/0186823 A1 | * | 9/2004 | Dittman | H04L 49/9073 |

(Continued)

*Primary Examiner* — April Y Blair
*Assistant Examiner* — Dipakkumar B Gandhi
(74) *Attorney, Agent, or Firm* — Michael Best & Friedrich LLP

(57) ABSTRACT

Methods and systems of managing data transfers in a fixture. One system includes fixtures comprising: a communication interface; and a processor configured to optimize download efficiency by: receiving, from a remote device via the communication interface, a file comprising a plurality of data blocks, wherein each of the plurality of data blocks comprise a unique cyclical redundancy check (CRC) value and a payload; determining, for each of the plurality of data blocks, a check value based on a polynomial division of the respective payload; determining an error in at least one of the plurality of data blocks based on a comparison between each of the respective CRC values and the respective check values; and providing, to the remote device via the communication interface, a request for retransmission of each of the at least one of the plurality of data blocks with the determined error.

12 Claims, 13 Drawing Sheets

(56) References Cited

U.S. PATENT DOCUMENTS

| | | | | |
|---|---|---|---|---|
| 2004/0255012 | A1* | 12/2004 | Kobayashi | H04L 41/0806 |
| | | | | 709/250 |
| 2006/0123161 | A1* | 6/2006 | L. Wallace | G06F 13/385 |
| | | | | 710/52 |
| 2006/0251028 | A1* | 11/2006 | Nagata | H04W 28/18 |
| | | | | 370/338 |
| 2007/0183383 | A1* | 8/2007 | Bitran | H04W 88/06 |
| | | | | 370/338 |
| 2008/0104485 | A1* | 5/2008 | Lyakh | H04L 1/0057 |
| | | | | 714/776 |
| 2010/0014419 | A1* | 1/2010 | Lee | H04W 80/06 |
| | | | | 370/225 |
| 2010/0325270 | A1* | 12/2010 | Ishizaka | F24F 11/30 |
| | | | | 709/224 |
| 2012/0224491 | A1* | 9/2012 | Norair | H04W 56/002 |
| | | | | 370/242 |
| 2016/0146683 | A1* | 5/2016 | Chau | B66C 23/905 |
| | | | | 73/862.391 |
| 2016/0344693 | A1* | 11/2016 | Wetterwald | H04L 61/103 |
| 2017/0005797 | A1* | 1/2017 | Lanc | H04L 9/0894 |
| 2017/0288820 | A1* | 10/2017 | Kela | H04L 1/1874 |
| 2020/0187289 | A1* | 6/2020 | Chen | H04B 7/0695 |
| 2021/0056216 | A1* | 2/2021 | Kurian | G06F 21/6209 |

* cited by examiner

CLOUD COMMUNICATION FOR AN EDGE DEVICE

FIELD

Embodiments relate to monitoring and managing a facility having a plurality of end point devices, and, more particularly, to a smart and connected modular battery powered end point device for internet-of-things ("IoT") applications.

SUMMARY

In the field of facility or building management, there is a desire to manage the performance of an Internet of Things (IoT) architecture of fixtures. Examples of such IoT enabled fixtures include faucets, flush valves, hand dryers, floor drains, air or room quality sensors, backflow preventers, bottle fillers, pressure sensors, leak detection sensors, occupancy detection sensors, resource dispensers (e.g., a soap dispenser, a sanitizer dispenser, a room deodorizer dispenser, a paper tower dispenser), and the like.

Accordingly, embodiments of the present disclosure are generally directed to systems and methods for management of IoT enabled fixtures. More particularly, embodiments of the present disclosure are directed to fixture management systems that integrate with building management solutions (BMS) (e.g., building automation and control network (BACnet) servers, computing devices, and the like) and are employed to, for example, collect fixture usage data, determine predictive maintenance, provide alerts, and provide commands in real-time to the network of integrated IoT enabled fixtures. Embodiments described herein include an IoT architecture of fixtures that communicate via endpoint devices and facility gateways with a cloud network (e.g., a cloud server). In some embodiments, the cloud network transmits the fixture data to a BACnet gateway device (e.g., through Long Range (LoRa) wide area network (WAN) radio frequency (RF) communication protocols). In some embodiments, the BACnet gateway device converts the fixture data, which is provided for display on a BACnet dashboard.

In some embodiments, the described system include IoT enabled fixtures. In some embodiments, these fixtures are configured (e.g., with firmware) to manage a battery or other power source that is housed within or otherwise attached to the fixture. For example, the fixtures can be configured to determine a chemistry of a battery in a fixture, measure a voltage of the battery at a known condition of the battery, or measure a battery status during a high-current pulse load. In some embodiments, these fixtures as configured to optimize data transfer from, for example, a remote device. For example, the fixtures can be configured to optimize download efficiency or recover from a disruption during an over the air (OTA) data transfer Accordingly, in one aspect, disclosed herein, are fixtures comprising: a communication interface; a battery; and a processor configured to determine a chemistry of the battery by: recording an initial voltage of the battery based on a current voltage of the battery; assigning a first chemistry for the battery based on the initial voltage; determining, when the current voltage of the battery meets a first threshold, a first voltage difference of the battery; determining, when the current voltage of the battery meets a second threshold, a second voltage difference of the battery; assigning a second chemistry for the battery based on the first voltage difference, the second voltage difference, and a measure of the current voltage of the battery when meeting the second threshold; and providing, to a remote device via the communication interface, a battery status determined based on the second chemistry for the battery.

In another aspect, disclosed herein, are fixtures comprising: a communication interface; a battery; and a processor configured to measure, as a battery status, a voltage of the battery at a known condition of the battery by: recording a time of a high-load event that includes the use of electric power provided by the battery; determining, based on an initiation of a battery condition check, whether the battery is in a recovery state by comparing a current time value to the recorded time of the high-load event; measuring the battery status when the battery is not in the recovery state; and providing the battery status to a remote device via the communication interface.

In another aspect, disclosed herein, are fixtures comprising: a communication interface; a battery; and a processor configured to measure a battery status during a high-current pulse load by: executing an event causing the high-current pulse load on the battery; continuously recording, at a defined interval, a voltage of the battery for a duration of the event; determining the battery status based on a lowest voltage reading during the event; and providing the battery status to a remote device via the communication interface.

In another aspect, disclosed herein, are fixtures comprising: a communication interface; and a processor configured to optimize download efficiency by: receiving, from a remote device via the communication interface, a file comprising a plurality of data blocks, wherein each of the plurality of data blocks comprise a unique cyclical redundancy check (CRC) value and a payload; determining, for each of the plurality of data blocks, a check value based on a polynomial division of the respective payload; determining an error in at least one of the plurality of data blocks based on a comparison between each of the respective CRC values and the respective check values; and providing, to the remote device via the communication interface, a request for retransmission of each of the at least one of the plurality of data blocks with the determined error.

In another aspect, disclosed herein, are fixtures comprising: a communication interface; a non-volatile memory; and a processor configured to recover from a disruption during an OTA data transfer by: initiating the OTA data transfer with the remote device via the communication interface; receiving from a remote device a plurality of data packets; persisting each of the plurality of data packets to the non-volatile memory as each of the plurality of data packets is received; determining, after a reset of the processor, a progress of the OTA data transfer by reading the plurality of data packets from the non-volatile memory; and providing, to the remote device, a request for resumption of the OTA data transfer based on the progress.

Particular embodiments of the subject matter described in this disclosure can be implemented so as to realize one or more of the following advantages. The system detects data errors in data blocks and provide for the blocks to be retransmitted separately, which is preferred to a typical battery power and download time required to retransmit an entire file if a data check is only made upon file completion. The system automatically determines a battery type so as not to force a user to specify the type of batteries installed. The system prevents battery analysis during activation as well as during a recovery period while the battery slowly returns to no-load voltage after the high-load event. The system prevents measure battery status by capturing minimum voltage during high-current surge to prevent a reset of the processor.

The system minimizes battery usage while establishing or restoring a network connection. The system reduces time and battery consumption for over-the-air file uploads and downloads. The system reduces the frequency of connecting to a remote device.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
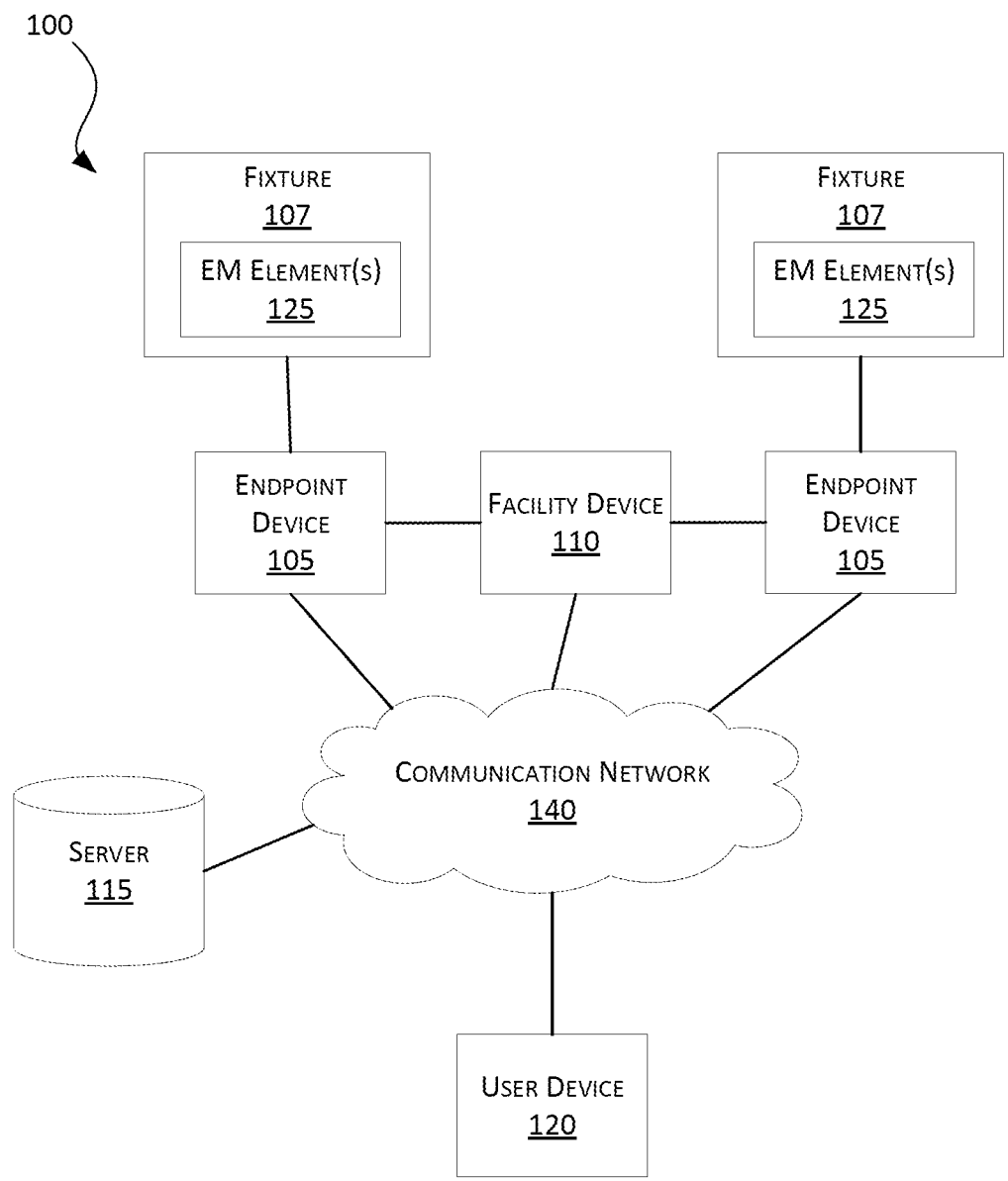
FIG. 1 schematically illustrates a system for monitoring and managing a facility having a plurality of end point devices according to some embodiments.

Before any embodiments of the disclosure are explained in detail, it is to be understood that the disclosure is not limited in its application to the details of embodiment and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical or hydraulic connections or couplings, whether direct or indirect.

It should also be noted that a plurality of hardware and software-based devices, as well as a plurality of different structural components may be used to implement the implementations. In addition, implementations may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one implementation, the electronic based aspects of the disclosure may be implemented in software (for example, stored on non-transitory computer-readable medium) executable by one or more processors. As such, it should be noted that a plurality of hardware and software-based devices, as well as a plurality of different structural components may be utilized to implement various implementations. It should also be understood that although certain drawings illustrate hardware and software located within particular devices, these depictions are for illustrative purposes only. In some implementations, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Definitions

Unless otherwise defined, all technical terms used herein have the same meaning as commonly understood by one of ordinary skill in the art to which the present subject matter belongs. As used in this specification and the appended claims, the singular forms "a," "an," and "the" include plural references unless the context clearly dictates otherwise. Any reference to "or" herein is intended to encompass "and/or" unless otherwise stated.

As used herein, the term "real-time" refers to transmitting or processing data without intentional delay given the processing limitations of a system, the time required to accurately obtain data and images, and the rate of change of the data and images. In some examples, "real-time" is used to describe the presentation of information obtained from components of embodiments of the present disclosure.

Example System

FIG. 1 depicts an exemplary embodiment of a system 100 that can be employed to execute implementations of the present disclosure. The example system 100 may be employed to, for example, monitor and manage a facility such as a building or one or more rooms within a building. As depicted, the system 100 includes a plurality of endpoint devices 105 (collectively referred to herein as "the endpoint devices 105" and individually as "an endpoint device 105"), a plurality of fixtures 107 (collectively referred to herein as "the fixtures 107" and individually as "a fixture 107"), a facility device 110 (for example, a gateway), a server 115 (for example, cloud server), and a user device 120. In some embodiments, the system 100 includes fewer, additional, or different components than depicted in FIG. 1. For example, the system 100 may include multiple facility devices 110, servers 115, user devices 120, or a combination thereof. Additionally, the system 100 may include any number of endpoint devices 105 and/or fixtures 107 and the two endpoint devices and fixtures depicted in FIG. 1 are purely for illustrative purposes. In some embodiments, one or more of the components of the system 100 are distributed among multiple devices, combined within a single device, or a combination thereof. As one example, in some embodiments, one or more of the endpoint devices 105 may be incorporated within a fixture 107 as a single device. Accordingly, in some embodiments, the functionality described as being performed by the endpoint device 105 (or a portion thereof) may be performed by a fixture 107 (including built-in or attached similar hardware and software components as the endpoint device 105).

In some embodiments, the endpoint devices 105, the fixtures 107, the facility device 110, the server 115, and the user device 120 communicate over one or more communication networks 140. Portions of the communication networks 140 may be implemented using a WAN, such as the Internet or a LoRa system, a local area network (LAN), such as a Bluetooth™ network or Wi-Fi, and combinations or derivatives thereof. In some embodiments, the communication network 140 includes a telecommunication network or data network. In some embodiments, the communication network 140 can be accessed over a wired or a wireless communications link, such as a network gateway.

In some embodiments, the communication network 140 includes a network of physical objects (or IoT) with mesh and start topological structures (e.g., Narrowband IoT (NBIOT), LoRa, ZigBee, general package radio service (GPRS), and Long-Term Evolution (LTE) category M1 (Cat1)). In some embodiments, the physical objects forming the communication network 140 include one or more components of the system 100. In some embodiments, one or more components of the system 100 communicate via LoRa or LoRaWAN networking protocols (for example, the endpoint device 105 and the facility device 110). In some embodiments, protocols can be adopted within communication network 140 for specific applications and environments. For example, mesh topology can be used for IOTs of a smaller scale. Moreover, a mesh topology generally supports longer distance data transmission and can be used for IOTs of a larger scale. Using such networking protocols provides for secure, encrypted communication of data without use of a customer or building network. Accordingly, use of such networking protocols may isolate an endpoint device 105 (or other component of the system 100) from a customer or building network.

Accordingly, in some embodiments components of the system 100 can be configured to communicate via Bluetooth, Wi-Fi, Zigbee, LTE/Cellular, wired ethernet, RS485/RS232, or the like. As one example, the endpoint devices 105 may communicate via LoRa with the facility device 110. In some embodiments, one or more components of the system 100 communicate directly as compared to through the communication network 140. For example, the endpoint devices 105 may communicate directly with the facility device 110. Also, in some embodiments, the components of the system 100 communicate through one or more intermediary devices (not shown in FIG. 1).

In some embodiments, the fixture 107 provides a water management solution, a building maintenance solution, a building operation solution, a building management solution, or a combination thereof. Example embodiments of fixture 107 include a faucet, a flushometer, a flush valve, a soap dispenser, a handwashing system, a water service line monitor, a backflow preventer, a floor drain, a hand dryer, a pressure sensor, a water use sensor, a flow sensor, a valve sensor, a lavatory, a toilet, a urinal, a water closet, a bottle and glass filler, a drain (e.g., a sink drain, a roof drain or floor drain network, and the like), a drinking water fountain, an air quality monitor, an air or room quality sensor (e.g., a service request or product replenishment request button or other suitable activator), a backflow preventer, a leak detection sensor, an occupancy detection sensor, a resource dispenser (e.g., a soap dispenser, a sanitizer dispenser, a room deodorizer dispenser, a paper tower dispenser), a fire protection device or fixture (e.g., a smart fire protection device or fixture), a waste receptacle (e.g., a garbage can or bin), a door handle, a thermal mixing valve, a contamination monitor (e.g., a *legionella* contamination sensor), and the like.

As depicted in FIG. 1, each of the fixtures 107 is associated with one or more EM elements 125. In some embodiments, the EM elements 125 are configured to monitor or influence the operation of the fixture 107. Example embodiments of fixture 107 include an EM element 125 include an actuator, a flow sensor, a position sensor, a proximity sensor, a thermocouple, and the like. In some embodiments, the EM elements 125 include an electrical only element, a mechanical only element, or a combination of an electrical and a mechanical element(s). In some embodiments, the EM elements 125 include a single-piece component or multiple components.

As an example, in some embodiments, the fixture 107 is a faucet having a sensor (e.g., as a first EM element 125) configured to detect the presence of a person within a specified zone. In some embodiments, when the sensor is triggered (e.g., by detecting the presence of the person), the sensor sends an "ON" signal to an actuator (as a second EM element 125) (e.g., a valve actuating solenoid) thereby allowing water to selectively flow through the faucet. In some embodiments, when the sensor is no longer triggered (e.g., by detecting the absence of a person), the sensor sends an "OFF" signal to the actuator to stop water flow through the faucet. In some embodiments, the actuator is configured to maintain the faucet in an open position for a predetermined period of time in response to receiving an "ON" signal. In some embodiments, the predetermined period of time is set by a user or facility entity via, for example, the facility device 110, the user device 120, another component of the system 100, or a combination thereof.

As another example, in some embodiments, the fixture 107 is a flush valve having a sensor (e.g., as a first EM element 125) configured to detect the presence of a person within a specified zone. In some embodiments, when the sensor is triggered (e.g., by detecting the presence of a person), the sensor sends an "ON" signal to the actuator (as a second EM element 125) (e.g., a valve actuating solenoid) to actuate a valve and initiate a flow of water for a flushing event. In some embodiments, the flush valve remains open for a predetermined period of time (e.g., 5 seconds, 10 seconds, 15 seconds, 20 seconds, 30 seconds, 45 seconds, 1 minute, 2 minutes, 3 minutes, 4 minutes, 5 minutes, and the like) at least partially dependent upon an operating parameter set by the user via, for example, the facility device 110, the user device 120, another component of the system 100, or a combination thereof.

As another example, in some embodiments, the fixture 107 is a resource dispenser (e.g., a soap dispenser or a hand towel dispenser) having a sensor (e.g., as a first EM element 125) configured to detect the presence of a person within a specified zone. In some embodiments, when the sensor is triggered (e.g., by the hands of a person), the sensor sends an "ON" signal to an actuator (e.g., as a second EM element 125) to trigger a resource dispensing event (e.g., actuation of a gear, a valve, or solenoid, and the like to initiate dispensing of a resource). In some embodiments, the resource dispenser is configured to allow a predetermined volume or amount of a resource to be dispensed for each activation. In some embodiments, the volume, amount, or timing of a resource to be dispensed is set and adjusted by the user via, for example, the facility device 110, the user device 120, another component of the system 100, or a combination thereof.

In some embodiments, the resource dispenser includes a second sensor e.g., as a third EM element 125) to monitor the level or amount of resource remaining in a reservoir or receptacle. In some embodiments, the second sensor detects a current level or amount of resource in the reservoir or receptacle at a given moment in time. In some embodiments, the second sensor detects when the resource falls below a predetermined amount or level.

As another example, in some embodiments, the fixture 107 is a water service line monitor. In some embodiments, the water service line monitor includes a sensor (e.g., as a first EM element 125) configured to be retrofit onto an existing water service line and is configured to monitor the flowrate of water therethrough, the presence of a backflow event, or a combination thereof. In some embodiments, the sensor is configured to detect a flow rate, a presence of a backflow event, and the like.

As another example, in some embodiments, the fixture 107 is a contamination monitor. In some embodiments, the contamination monitor includes a sensor (e.g., as a first EM element 125) for detecting contamination of a water supply, such as legionella contamination, microorganism contamination, nitrate and nitrite contamination, and the like. Accordingly, in some embodiments, the sensor is configured to detect the existence of a contaminant, a contamination level, or a combination thereof. A contaminant may include, for example, lead, copper, chlorine, arsenic, nitrate, fluoride, mercury, microorganism(s) (e.g., bacteria, viruses, parasites, and the like), and the like. In some embodiments, the sensor is configured to be retrofitted onto an existing water service line (e.g., in a water pipe or at a water valve). As an example, in some embodiments, the sensor is a legionella contamination sensor configured to detect the existence of and a contamination level of legionella of water in a water service line.

As another example, in some embodiments, the fixture 107 is a thermal mixing valve (e.g., a thermostatic mixing valve) having a first valve (e.g., a first EM element 125) associated with a hot water input, a second valve (e.g., a second EM element 125) associated with cold water input, and at least one valve actuator (e.g., a third EM element 125). In some embodiments, the at least one valve actuator is a mechanism that receives a temperature input or control (e.g., from a user of a faucet associated with the thermal mixing valve). In some embodiments, a valve actuator includes, for example, a faucet handle, a temperature dial, or another type of temperature input mechanism. In some embodiments, when the thermal mixing valve is associated with a faucet and the faucet is "ON" (i.e., water is flowing), a user of the faucet may provide a temperature input or control via the at least one valve actuator. In some embodiments, based on the temperature input or control, the first valve, the second valve, or a combination thereof, are actuated such that the temperature input or control provided by the user is applied to the water flowing through the faucet.

In some embodiments, the thermal temperature valve is associated with a temperature sensor (e.g., a fourth EM element 125) configured to detect and monitor a temperature associated with water flowing through the faucet, a temperature associated with a temperature input or control provided via the valve actuator, or a combination thereof. For example, in some embodiments, the temperature sensor detects a temperature associated with water flowing through the faucet such that the temperature is monitored in comparison to a temperature threshold or range. As an example, in some embodiments, when the temperature detected by the sensor is outside of a temperature range (e.g., too hot or too cold) a warning or alert is issued. In some embodiments, when the temperature exceeds the temperature range or threshold, the warning or alert indicates a scalding condition where the water flowing through the faucet is too hot. In some embodiments, when the temperature is below the temperature range or threshold, the warning or alert indicates a cold-water condition where the water flowing through the faucet is too cold or a fault with a hot water heater or heating system of a building.

As another example, in some embodiments, the fixture 107 is an air quality monitor having an air quality sensor (e.g., a first EM element 125) configured to detect and monitor an air condition associated with a facility. In some embodiments, the air quality sensor collects data associated with a facility such that the facility is monitored for indoor air pollutants. In some embodiments, an indoor air pollutant includes, for example, carbon monoxide (CO), radon, nitrogen dioxide (NO2), second-hand smoke, lead particles, mold, and the like. In some embodiments, the air quality monitor includes an alert mechanism (e.g., a second EM element 125) that provides or generates an audible alert, a visual alert, another type of alert, or a combination thereof. In some embodiments, the alert mechanism includes, for example, a speaker for generating an audible alert, an LED or other display device for generating a visual alert, and the like.

As another example, in some embodiments, the fixture 107 is a door handle. In some embodiments, the door handle is associated with a door (e.g., a bathroom stall door, a family bathroom door, or a door of a facility as a whole). In some embodiments, the door handle includes a sensor (e.g., a first EM element 125) configured to monitor or detect use of the door associated with the door handle. In some embodiments, the sensor detects an occupancy of a family bathroom by monitoring the opening and closing of the door handle. In some embodiments, the sensor detects an overall use of a specific bathroom stall based on how often the door handle associated with that specific bathroom stall is opened and closed within a predetermined period of time, such as a 24-hour period, an hour period, a week, and the like.

As another example, in some embodiments, the fixture 107 is a fire protection device (e.g., a fire suppression device, a smoke detector, or a sprinkler) having a sensor (e.g., a first EM element 125) configured to monitor an environment for the presence of a fire condition, such as smoke. In some embodiments, when the sensor is triggered (e.g., by detecting the presence of a fire condition), the sensor sends an "ON" signal to the actuator (as a second EM element 125) (e.g., a valve actuating solenoid) to actuate a valve and initiate a release of a fire suppressing agent, such as water. In some embodiments, the valve remains open for a predetermined period of time at least partially dependent upon an operating parameter set by the user via, for example, the facility device 110, the user device 120, another component of the system 100, or a combination thereof. In some embodiments, the valve remains open until receipt of a manual shut off signal (e.g., from a fire fighter) via, for example, the facility device 110, the user device 120, another component of the system 100, or a combination thereof. In some embodiments, the valve remains open until the sensor is no longer triggered (e.g., when the presence of the fire condition is no longer detected). For example, in some embodiments, when the sensor is no longer triggered (e.g., by detecting the absence of a fire condition), the sensor sends an "OFF" signal to the actuator to stop the release of the fire suppressing agent.

In some embodiments, the sensor is configured to detect an operational status of the fire protection device. As an example, in some embodiments, an operational status of the fire protection device is "operational" when the fire protection device is operating as expected or designed. As another example, in some embodiments, an operational status of the fire protection device is "not operational" when the fire protection device is not operating as expected or designed. As another example, in some embodiments, the operational status of the fire protection device is "in need of service" when the fire protection device is in need of service. In some embodiments, the sensor detects or checks the operational status of the fire protection device according to a predetermined schedule, such as every week, every day, every month, and the like.

As another example, in some embodiments, the fixture 107 is a waste receptacle (e.g., a trash or garbage can, a waste disposal container, a sanitary napkin disposal receptacle, a biohazard or medical waste disposal receptacle, and the like) having a sensor (e.g., a first EM element 125) configured to monitor the level or amount of waste in a reservoir or receptacle. In some embodiments, the sensor detects a current level or amount of waste in the container or receptacle. In some embodiments, the sensor is configured to monitor or detect a usage of the waste receptacle (e.g., how many times the waste receptacle is used). As an example, in some embodiments, the sensor is configured to count the number of times a lid of the waste receptacle is opened or triggered to open via, for example, a foot-pedal. As another example, in some embodiments, the sensor is configured to count how many times waste is deposited into the waste receptacle via, for example, motion sensing.

As another example, in some embodiments, the fixture 107 is a drain (e.g., a sink drain, a roof drain, a floor drain, and the like) having a sensor (e.g., a first EM element 125) configured to monitor an amount of water flowing through the drain. In some embodiments, the drain is a sink drain, and the sensor monitors an amount of water flowing through the sink drain such that a usage of a sink associated with the sink drain may be monitored, a run-on condition of a faucet associated with the sink drain may be detected, and the like. In some embodiments, the drain is a floor drain, and the sensor monitors an amount of water flowing through the floor drain such that a usage of a shower stall associated with the floor drain may be monitored, an over-flow condition or leak condition of another fixture (e.g., a facet, or a toilet) is detected, and the like. In some embodiments, the drain is a roof drain, and the sensor monitors an amount of water flowing through the roof drain such that usage of the roof drain is monitored and used to determine, for example, maintenance needs, predict remaining life cycle of the roof drain, and the like. In some embodiments, the sensor monitors a flow rate of water flowing through the roof drain in comparison to other roof drains. For example, in some embodiments, when two roof drains are experiencing a heavy water flow while a third roof drain (proximate to the two roof drains) is experiencing little to no water flow, the third roof drain may be clogged or obstructed (e.g., by leaves or other debris). Accordingly, in some embodiments, the system 100 include a network of fixtures, such as a first fixture, a second fixture, and the like (e.g., a network of roof drains).

As depicted in FIG. 1, in some embodiments, the endpoint device 105 includes a communication link with at least one fixture 107. In some embodiments, the endpoint devices 105 span multiple facilities, locations, rooms, and the like. In some embodiments, each of the endpoint devices 105 is associated with (e.g., located within) the same facility (e.g., a restroom). In some embodiments, the each of the endpoint devices 105 is associated with multiple facilities. As an example, a first endpoint device may be associated with a first facility and a second endpoint device may be associated with a second different facility that is either in the same building as the first facility or in an entirely different building. In some embodiments, each of the endpoint devices 105 is associated with the same type of restroom fixture (e.g., the fixture 107). However, in other embodiments, the each of the endpoint devices 105 is associated with multiple different types of restroom fixtures (e.g., the fixture 107). For example, a first endpoint device may be associated with a faucet (as a first fixture 107) and a second endpoint device may be associated with a soap dispenser (as a second fixture 107).

Figure 2:
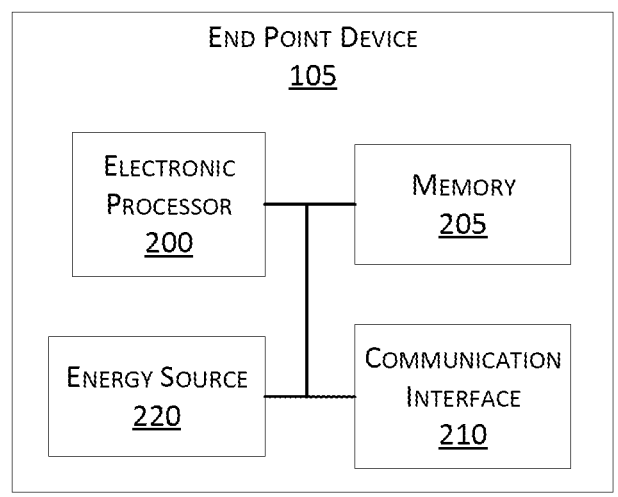
FIG. 2 schematically illustrates an end point device included in the system of FIG. 1 according to some embodiments.

FIG. 2 depicts an exemplary embodiment of the endpoint device 105. As depicted, the endpoint device 105 includes an electronic processor 200, a memory 205, a communication interface 210, and an energy source 220. In some embodiments, the electronic processor 200, the memory 205, the communication interface 210, and the energy source 220 communicate wirelessly, over one or more communication lines or buses, or a combination thereof. In some embodiments, one or more components of the endpoint device 105 are distributed among multiple devices, integrated into a single device, or a combination thereof. In some embodiments, the endpoint device 105 perform additional functionality other than the functionality described herein. In some embodiments, the endpoint device 105 include additional, different, or fewer components than those illustrated in FIG. 2. As an example, in some embodiments, the endpoint device 105 includes multiple energy sources 220. As another example, in some embodiments, the endpoint device 105 includes one or more expansion ports allowing for future expansion of the endpoint device 105. As such example, additional EM elements of a fixture 107 may be connected to the endpoint device 105 via the one or more of the expansion ports.

In some embodiments, the communication interface 210 allows the endpoint device 105 to communicate with devices external to the endpoint device 105. For example, as depicted in FIG. 1, the endpoint device 105 may communicate with the fixture 107 (or an EM element 125 thereof), the facility device 110, the server 115, the user device 120, the BACnet gateway device 122, the BMS 123, or a combination thereof through the communication interface 210. In some embodiments, the communication interface 210 includes a port for receiving a wired connection to an external device (e.g., a universal serial bus (USB) cable), a transceiver for establishing a wireless connection to an external device (e.g., over one or more communication networks 140, such as the Internet; LAN; a WAN, such as a LoRa network or system, and so forth), or a combination thereof. As an example, in some embodiments, the communication interface 210 includes a port for receiving a wired connection between the facility device 110 and an EM element 125 of a corresponding fixture 107. As another example, in some embodiments, the communication interface 210 includes a radio or transceiver for establishing a wireless connection, over a LoRa system or network, between the endpoint device 105 and the facility device 110.

In some embodiments, the electronic processor 200 includes a microprocessor, an application-specific integrated circuit (ASIC), or a suitable electronic device for processing data. In some embodiments, the memory 205 includes a non-transitory, computer-readable storage medium. In some embodiments, the electronic processor 200 is configured to access and execute computer-readable instructions (software) stored in the memory 205. In some embodiments, the software includes firmware, one or more applications, program data, filters, rules, one or more program modules, and other executable instructions. For example, in some embodiments, the software includes instructions and associated data for performing a set of functions, including the methods described herein. For example, in some embodiments, the electronic processor 200 is configured to enable management or monitoring of the operation of the corresponding fixture 107 either directly or indirectly (e.g., via the EM element(s) 125 of the corresponding fixture 107). In some embodiments, the electronic processor 200 enables management or monitoring of the operation of a corresponding fixture 107 by receiving fixture data from the fixtures 107, converting the fixture data for transmission, and enabling transmission of the converted data to, for example, the facility device 110, the server 115, the user device 120, the BACnet gateway device 122, another component of the system 100, or a combination thereof.

In some embodiments, the electronic processor 200 is configured to interact with and collect data (either directly or indirectly) regarding an operation of a fixture 107 (as fixture data) via the EM elements 215. In some embodiments, the endpoint device 105 is configured to remain in a sleep mode (or deep sleep mode) until an action or operation is detected with respect to a fixture 107 associated with the endpoint device 105 (e.g., detecting the presence of a user). In response to detecting the action or operation, the endpoint device 105 may then wake-up to receive fixture data, convert the fixture data for transmission, and transmit the fixture data (in a minimum power consumption mode) to, for example, the facility device 110, the server 115, the user device 120, another component of the system 100, or a combination thereof. This results in optimized battery life for the product. To further aid in the power optimization, in some embodiments, the transmission of converted fixture data (e.g., as one or more data packets) from the endpoint device 105 to the facility device 110 occurs through an adaptable data rate that automatically selects an available channel.

As depicted in FIG. 2, the endpoint device 105 includes the energy source 220. In some embodiments, the energy source 220 powers one or more components of the endpoint device 105, such as the electronic processor 200. In some embodiments, the energy source 220 is a battery, such as an energy efficient battery, a re-chargeable battery, a lithium-ion battery, a replaceable battery, and the like. As an example, in some embodiments the energy source 220 is a standard battery (e.g., an AAA, AA, C, or D sized batteries). As noted above, in some embodiments, the endpoint device 105 includes multiple energy sources 220 (e.g., a first energy source, a second energy source, and the like). In such embodiments, the multiple energy sources 220 are the same type, different types, or a combination thereof. As an example, in some embodiments, the endpoint device 105 includes three AA batteries as the energy sources 220. In some embodiments, the endpoint device 105 is coupled to and receives power from a power source associated with the facility, the building, another component, and the like.

In some embodiments, one or more components of the system 100 are present in a completed fixture 107 (e.g., a proximity sensor and an actuator in an automated faucet). In such embodiments, additional components may be retrofit onto the existing fixture 107. Accordingly, in some embodiments, the endpoint device 105 (or components thereof) may be retrofit onto or into the existing fixture 107. As an example, in some embodiments, a transmitter, a receiver, a transceiver, or a combination thereof (as part of the communication interface 210), the electronic processor 200, the energy source 220, or a combination thereof are mounted in the plumbing immediately upstream of a particular fixture 107. In other examples, in some embodiments, the retrofit includes updating firmware in the existing device. In still other examples, in some embodiments, the retrofit includes integrating elements into a previously existing fixture 107.

Electronics Housing

Figure 3A:
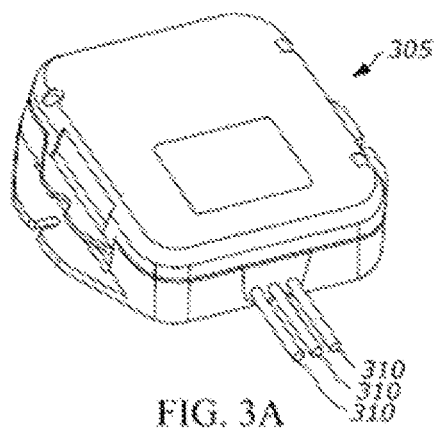
FIGS. 3A-3C illustrate an example electronics housing for an end point device according to some embodiments.
Figure 3B:
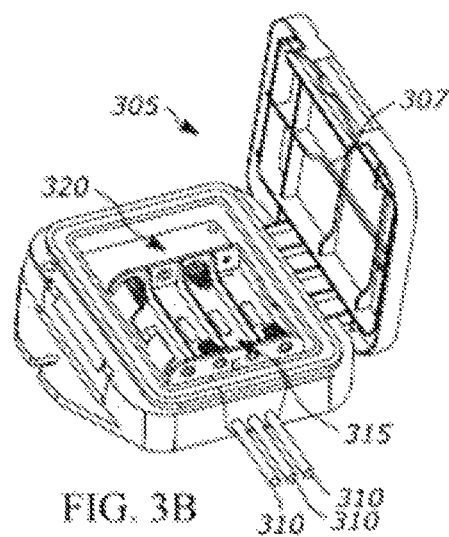
Figure 3C:
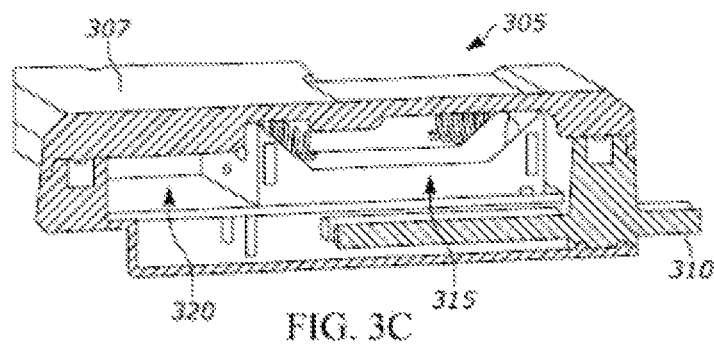

FIGS. 3A-3C depict an example electronics housing 305 for the end point device 105 according to some embodiments. As depicted in FIGS. 3A-3C, the example end point device 105 includes one or more wires or cables 310 extending from the housing 305. In some embodiments, the wires 310 are connected directly or indirectly to, for example, one or more of the EM elements 125 of a fixture 107 associated with the end point device 105. As depicted in FIGS. 3B-3C, the housing 305 includes a battery holder 315 (e.g., an energy source holder) for receiving one or more batteries (e.g., as the energy sources 220). As depicted in FIG. 3B, in some embodiments, the housing 305 includes a lid portion 307. The lid portion 307 allows a user to easily access the components enclosed within the housing 305 (e.g., to remove and replace one or more of the energy sources 220). FIGS. 3B-3C also depict a circuit board 320 enclosed within the housing 305 (e.g., one or more electronical components of the end point device 105, such as the electronic processor 200).

Circuit Diagram

Figure 4A:
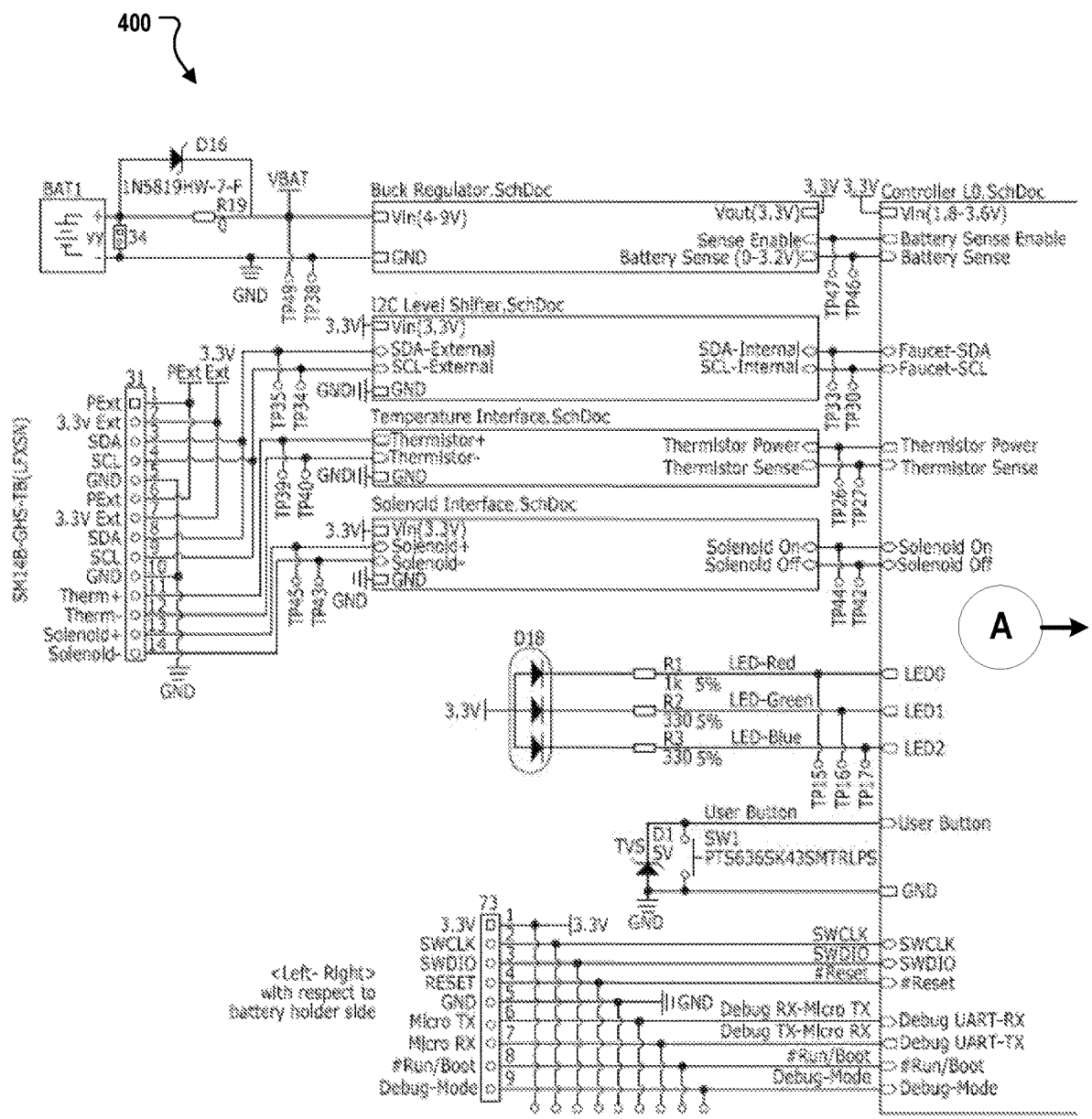
FIGS. 4A and 4B illustrate an example circuit diagram for electronics of an end point device according to some embodiments.
Figure 4B:
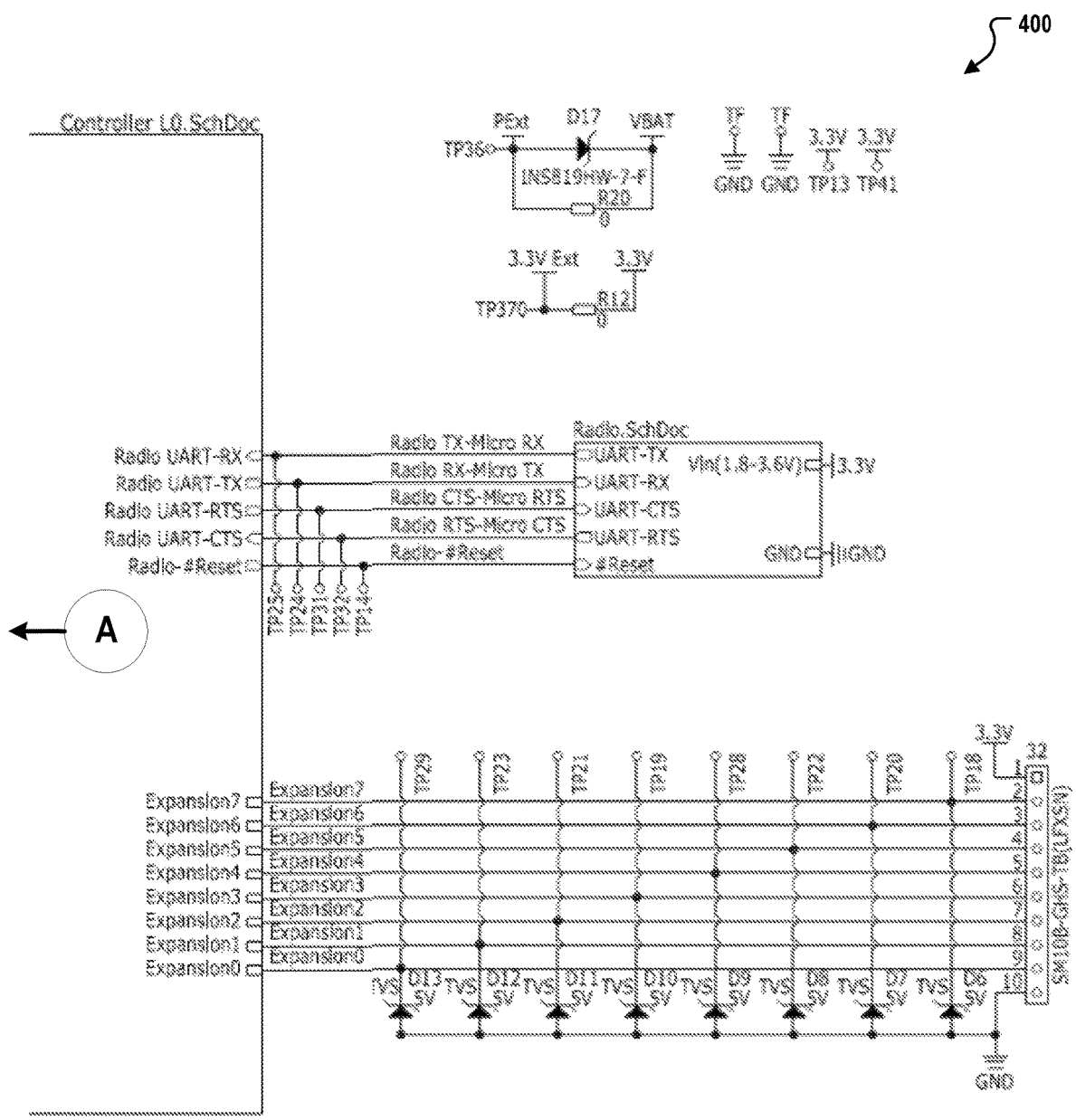

FIGS. 4A and 4B depict an example circuit diagram 400 for the circuit board 320 of the end point device 105 according to some embodiments. As noted above, in some embodiments, one or more components of the system 100 may be retrofit onto or into an existing fixture 107. Accordingly, in some embodiments, the electronics housing 305 (and the components therein) may be retrofit to an existing fixture 107. In some embodiments, the end point device 105 is mounted to a fixture 107 and communicatively connect the fixture 107 to the end point device 105 (e.g., by connecting EM elements 125 of the fixture 107 to the end point device 105 directly or indirectly via one or more of the wires or cables 310). Accordingly, in some embodiments, one or more components of the end point device 105 (such as the electronics housing 305, including the components therein) are designed as discrete, self-enclosed, add-on components or devices capable of retrofitting to an existing installation of a fixture 107.

Facility Device

Figure 5:
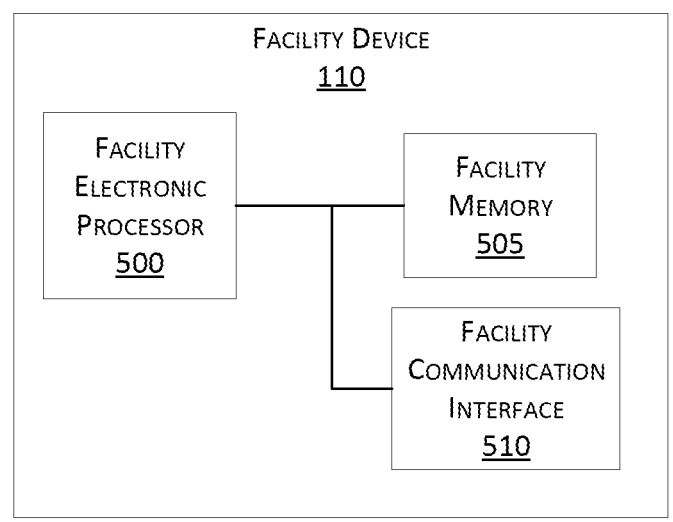
FIG. 5 schematically illustrates a facility device included in the system of FIG. 1 according to some embodiments.
Figure 6A:
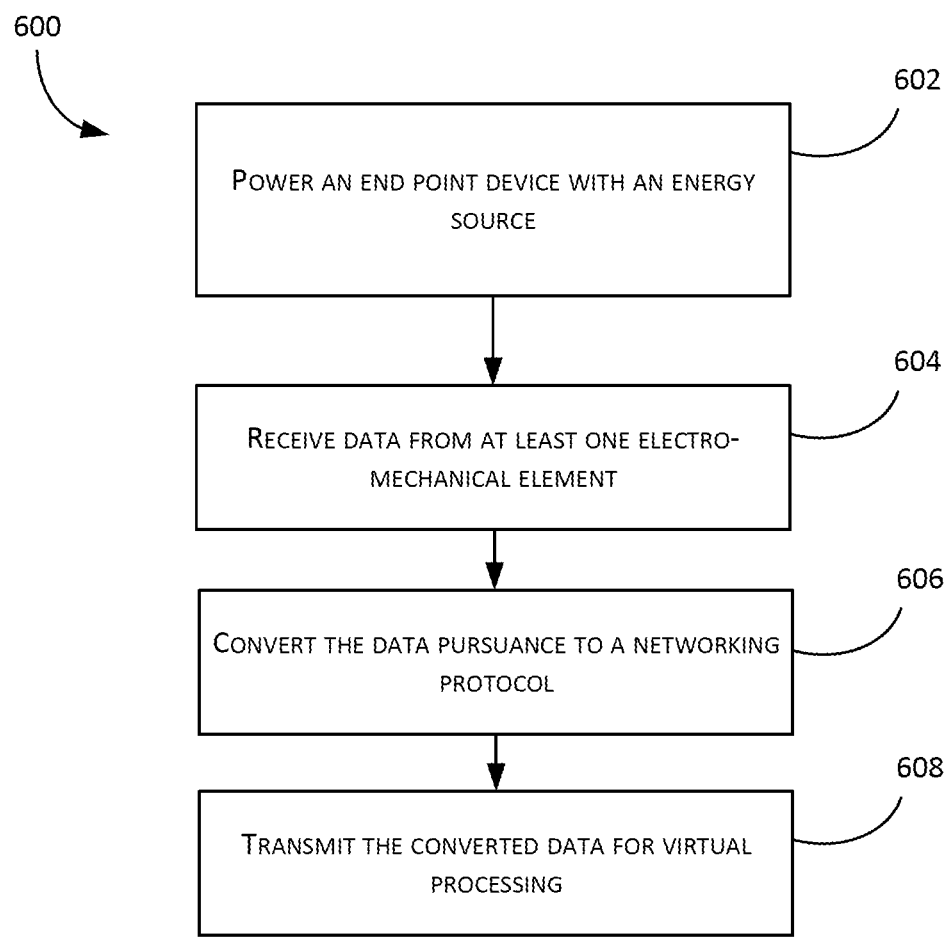
FIGS. 6A-6F illustrate flowcharts of processes that can be employed according to some embodiments.
Figure 6B:
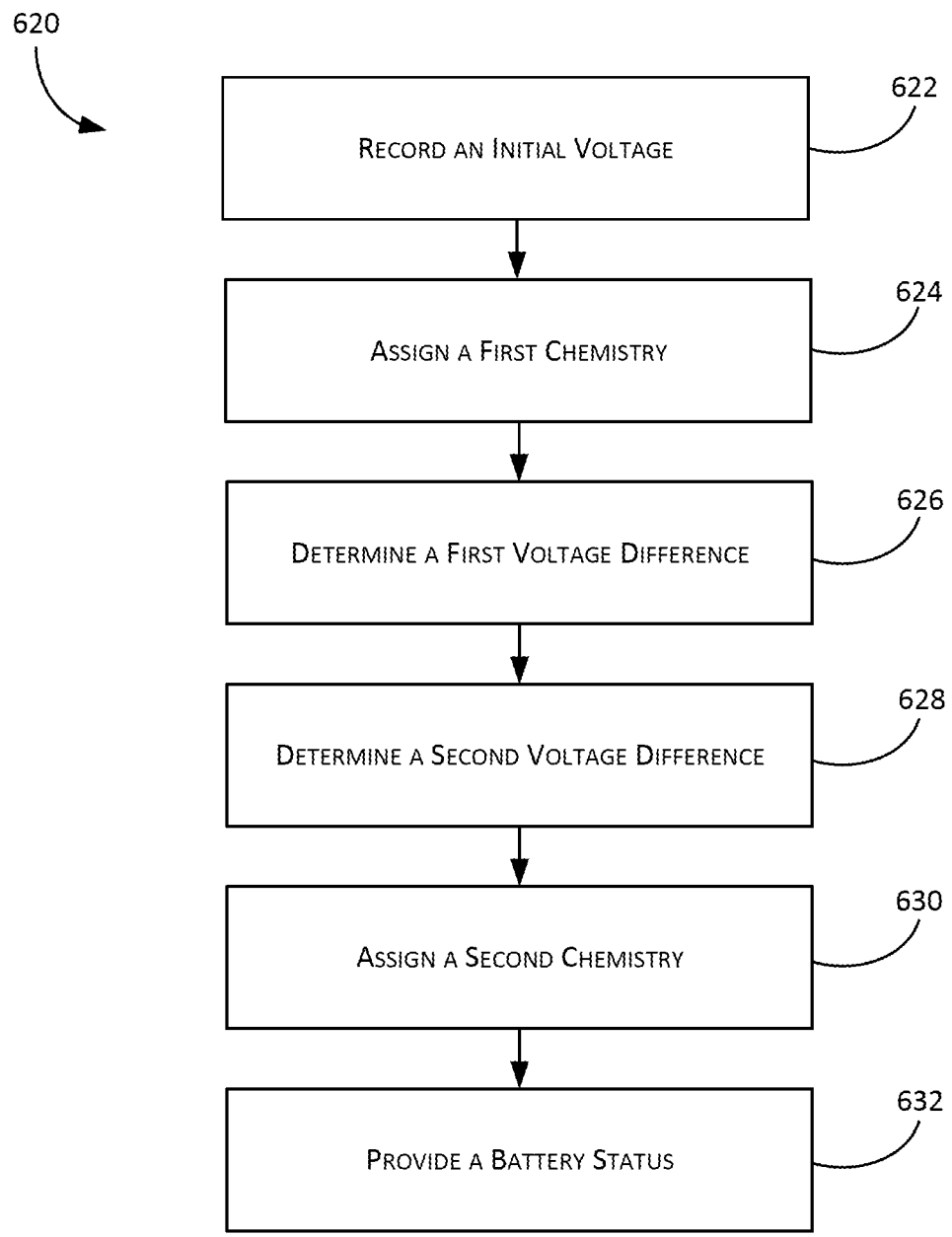
Figure 6C:
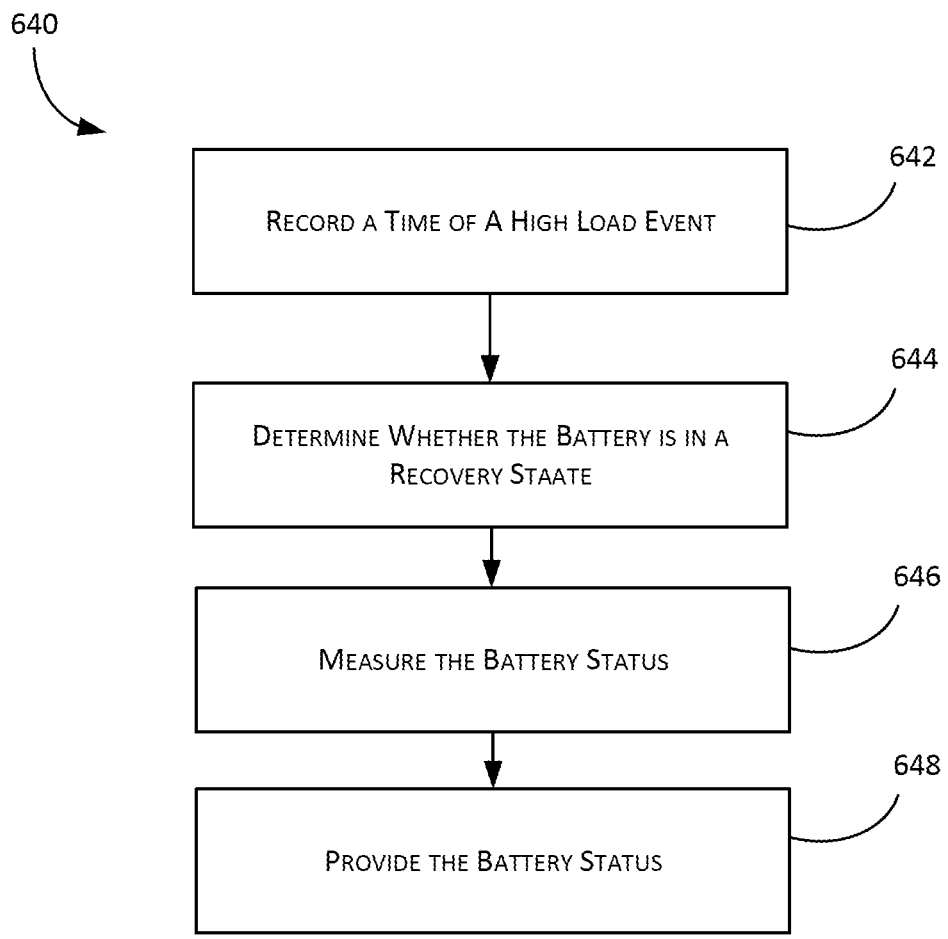
Figure 6D:
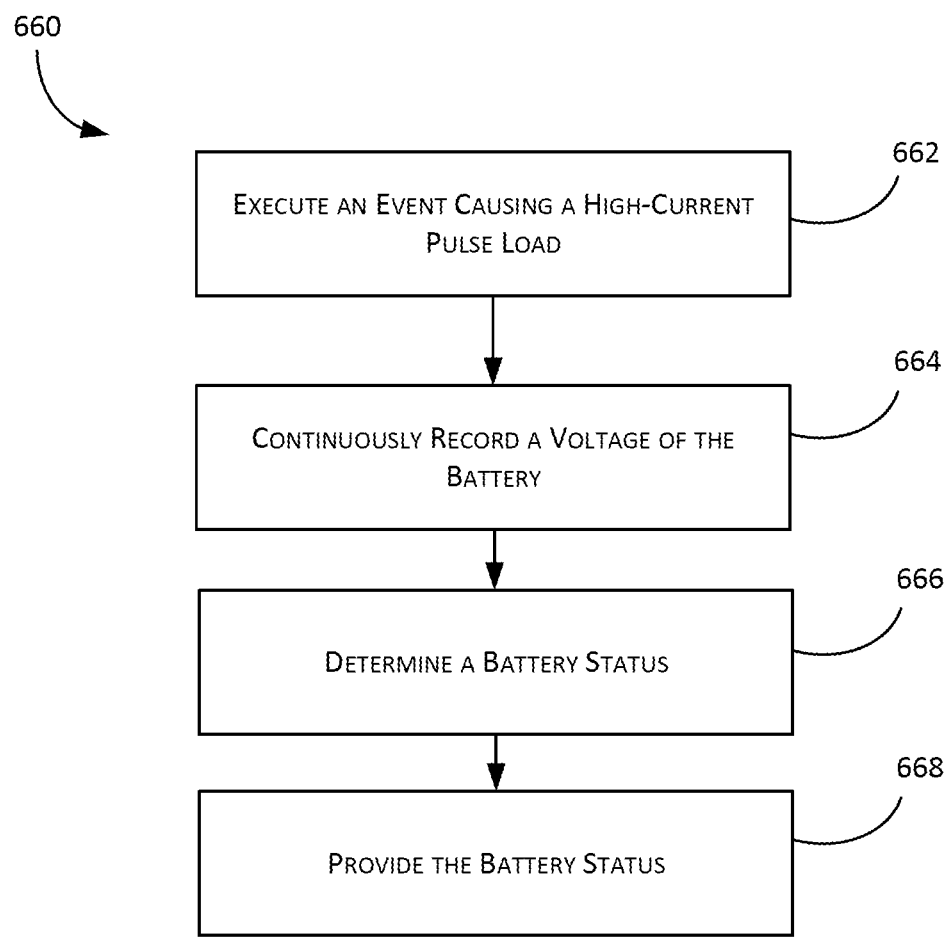
Figure 6E:
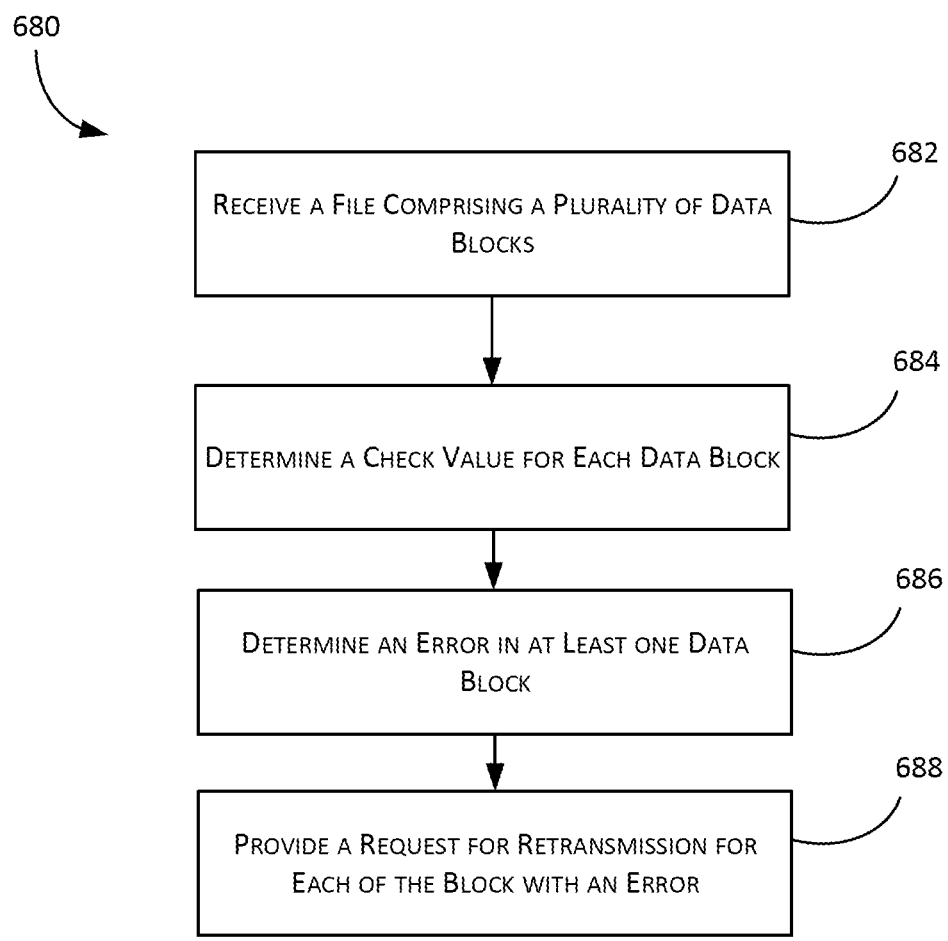
Figure 6F:
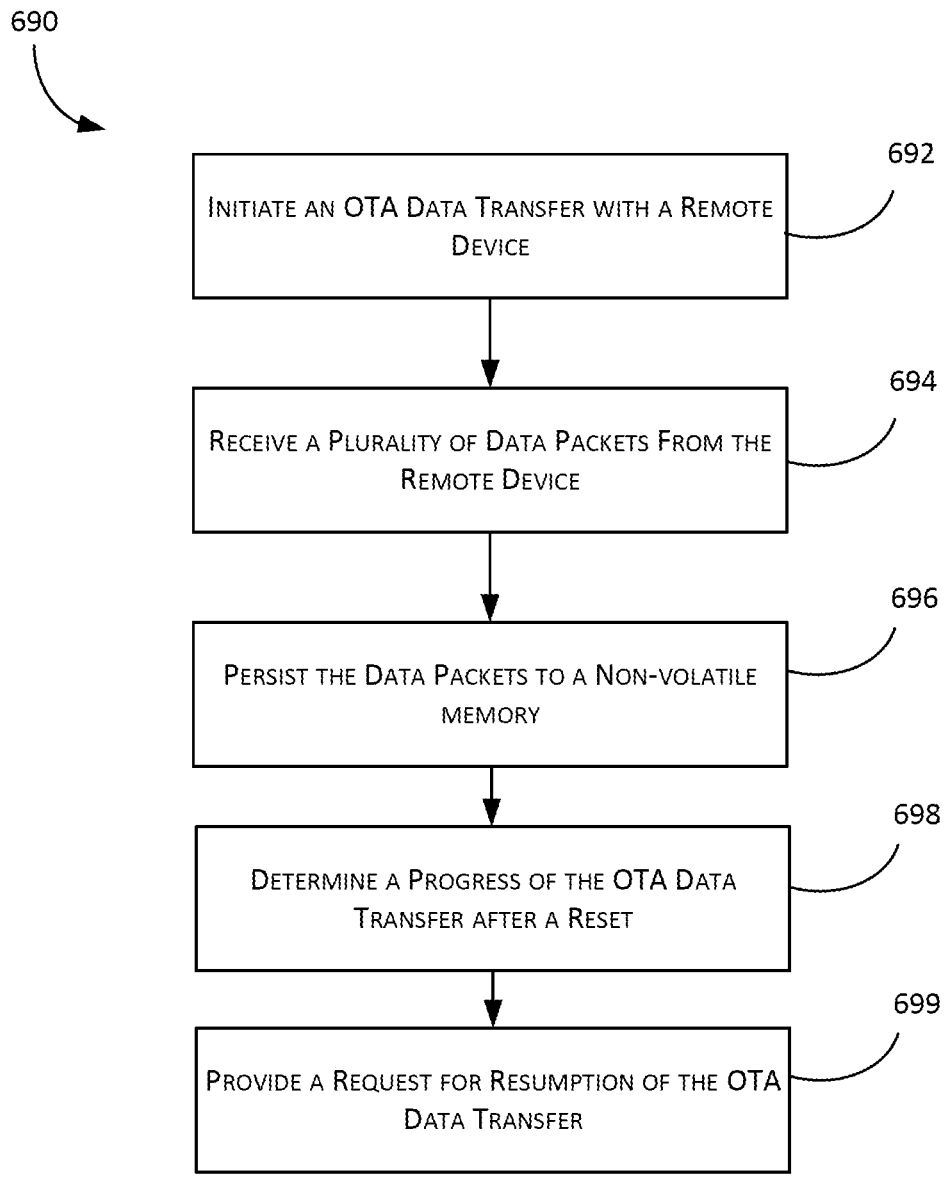

FIG. 5 depicts an exemplary embodiment of the facility device 110. As depicted, the facility device 110 includes a facility electronic processor 500, a facility memory 505, and a facility communication interface 510. In some embodiments, the facility electronic processor 500, the facility memory 505, and the facility communication interface 510 communicate wirelessly, over one or more communication lines or buses, or a combination thereof. In some embodiments, the facility device 110 includes additional, different, or fewer components than those illustrated in FIG. 5. For example, in some embodiments, the facility device 110 includes a human-machine interface for interacting with a user. In some embodiments, the human machine interface includes one or more input devices, one or more output devices, or a combination thereof. In some embodiments, one or more components of the facility device 110 are distributed among multiple devices, integrated into a single device, or a combination thereof. In some embodiments, the functionality (or a portion thereof) described herein as being performed by the facility device 110 is be distributed among multiple devices.

In some embodiments, the facility device 110 communicates with external devices via the facility communication interface 510. For example, in some embodiments and as illustrated in FIG. 1, the facility device 110 communicates with the endpoint devices 105, the fixtures 107, the server 115, the user device 120, or a combination thereof through the facility communication interface 510. In some embodiments, the facility communication interface 510 includes a port for receiving a wired connection (e.g., a USB cable) to an external device, a transceiver for establishing a wireless connection (e.g., over one or more communication networks 140, such as the Internet; a LAN; or a WAN, such as a LoRa system) to an external device, or a combination thereof.

In some embodiments, the facility electronic processor 500 is configured to access and execute computer-readable instructions ("software") stored in the facility memory 505. In some embodiments, the software includes firmware, one or more applications, program data, filters, rules, one or more program modules, and other executable instructions. For example, in some embodiments, the software includes instructions and associated data for performing a set of functions, including the methods described herein.

In some embodiments, the facility device 110 serves as a gateway or intermediary device that receives data and forwards the data to another component for processing. As an example, in some embodiments, the facility device 110 receives fixture data from the electronic processors 200 of one or more of the endpoint devices 105 and forwards the data to another component for processing, such as the server 115, the user device 120, or a combination thereof. Accordingly, in some embodiments, the facility device 110 forwards the data to a remote device (e.g., the server 115) for virtual processing. As another example, in some embodiments, the facility device 110 receives processed data (e.g., fixture data processed by the server 115) from a remote device (e.g., the server 115). As noted above, in some embodiments, the functionality (or a portion thereof) performed by the facility device 110 may be performed by another remote device or server (not shown).

Server Device

Returning to FIG. 1, as depicted, the server 115 and the user device 120 are computing devices, such as a desktop computer, a laptop computer, a tablet computer, a terminal, a smart telephone, a smart television, a smart wearable, or another suitable computing device that interfaces with a user. Although not depicted in FIG. 1, in some embodiments, the server 115 and the user device 120 include similar components as the facility device 110, such as an electronic processor (e.g., a microprocessor, an ASIC, or another suitable electronic device), a memory (e.g., a non-transitory, computer-readable storage medium), a communication interface (e.g., a transceiver) for communicating over the communication network 140. In some embodiments, the server 115 and the user device 120 include one or more additional communication networks or connections. In some embodiments, the server 115 and the user device 120 include one or more human machine interfaces.

In some embodiments, the server 115 includes multiple electronic processors, multiple memory modules, multiple communication interfaces, or a combination thereof. In some embodiments, the server 115 is a server-class hardware type device. In some embodiments, the functionality described herein as being performed by the server 115 may be performed in a distributed nature by a plurality of computing devices (or servers) located in various geographic locations. In some embodiments, server 115 includes computer systems using clustered computers and components to act as a single pool of seamless resources when accessed through the network 140. For example, such implementations may be used in data center, cloud computing, storage area network (SAN), and network attached storage (NAS) applications. In some embodiments, the server 115 is deployed using a virtual machine(s). For example, in some embodiments, the functionality described herein as being performed by the server 115 is performed by a plurality of computing devices included in a cloud computing environment.

In the server 115, is coupled to a at least one data store. In some embodiments, the data store is a repository for persistently storing and managing collections of data. Example data store that may be employed such as a database (e.g., lite weight database) as well as simpler store types, such as files, emails, and the like. In some embodiments, the data store includes a database, which may include a series of bytes or an organized collection of data that is managed by a database management system (DBMS). In some embodiments, the data store is provided via a distributed ledger (e.g., a blockcham).

In some embodiments, the server 115 is configured to monitor and manage one or more facilities (e.g., individual restrooms or entire buildings), which includes the fixtures 107 therein. In some embodiments, the server 115 (via an electronic processor of the server 115) receives fixture data from the facility device 110. In response to receiving the fixture data, in some embodiments, the server 115 processes the fixture data and determines usage information or patterns associated with the one or more facilities (and included fixtures 107 thereof). In some embodiments, the server 115 stores the usage information or patterns in, for example, a data store that uses the memory of the server 115. In some embodiments, the server 115 transmits the usage information or patterns to a remote device for storage.

In some embodiments, access data associated with one or more facilities (e.g., the usage information or patterns determined by the server 115) is provided to users via the user device 120. In some embodiments the user device 120 is employed by an end user (e.g., a facility entity) to monitor and manage a facility (e.g., a single restroom or multiple restrooms in a building), a building, one or more fixtures 107 of a facility or building, or a combination thereof. For example, in some embodiments, a user accesses and interacts with the data determined by the server 115 to view and understand usage patterns, which may provide insights into, for example, how to optimize cleaning and maintenance schedules; whether there is a need for additional facilities, endpoint devices; and the like. For example, in some embodiments, to communicate with the server 115 (e.g., the usage information or patterns determined by the server 115), the user device 120 stores a browser application or a dedicated software application executable by an electronic processor for interacting with the server 115.

In some embodiments, when an endpoint device 105 cannot connect to a facility device 110 or the server 115 (e.g., the connection the network 140 is dropped), the endpoint device 105 sends a request for current operations to the facility device 110 or the server 115 once a network connection is reestablished. In some embodiments, the facility device 110 or the server 115 will periodically send an operation to a designated endpoint device 105 until a receipt message is received for the endpoint device 105 (e.g., when the endpoint device has reestablished a connection to the network 140).

Figure 7:
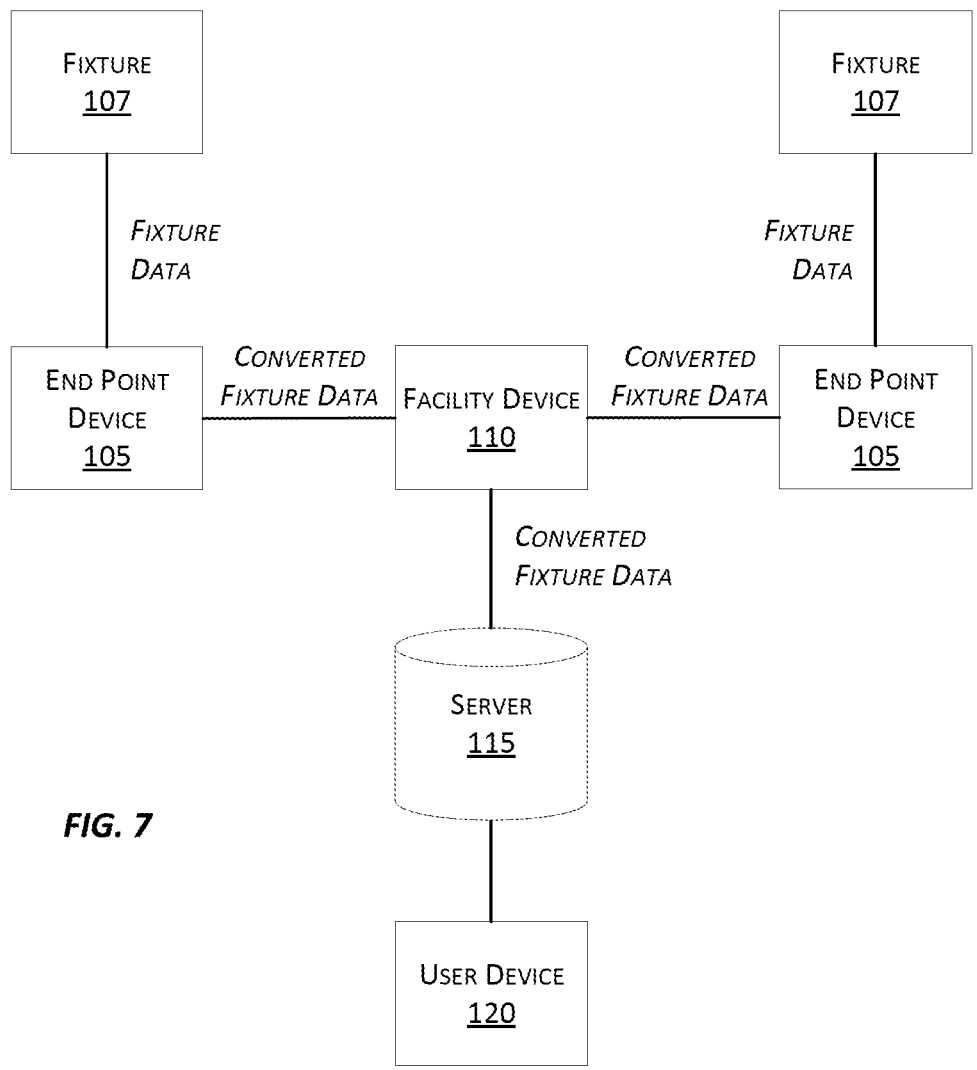
FIG. 7 schematically illustrates communication between components of the system of FIG. 1 according to some embodiments.

FIGS. 6A-6F depict a flowchart of a non-limiting, exemplary process 600, 620, 640, 660, 680, and 690 respectively. Each of these processes can be executed by, for example, fixture 107, end point device 105, server 115, or user device 120, according to implementation by embodiments of the present disclosure. For clarity of presentation, the description that follows generally describes the processes 600-670 in the context of FIGS. 1-5 and 7. For example, the process 600 is described with reference to FIG. 7. FIG. 7 depicts an exemplary embodiment of communication between the components of the system 100. However, it will be understood that the process the processes 600, 620, 640, 660, 680, and 690 may be performed by any other suitable system or a combination of systems as appropriate.

Example Processes

For process 600, at 602, the end point device 105 is powered by the energy source 220. Accordingly, in some embodiments, the energy source 220 is local to the end point device 105. As noted above, in some embodiments, the end point device 105 is provided or mounted to a wall in a facility or to a pre-existing installation of a fixture 107. However, in other embodiments, the end point device 105 is provided to or mounted to the fixture 107 prior to or during installation of the fixture 107 within a facility. As one example, the electronic housing 305 of FIGS. 3A-3C are provided or mounted to a wall in a facility or to the fixture 107. In some embodiments, the energy source 220 powers one or more components of the end point device 105. For example, in some embodiments, the energy source 220 powers the electronic processor 200. From 602, the process 600 proceeds to 604.

At 604, receives data (e.g., the fixture data) is received from at least one EM element 125 (e.g., a first EM element) included in a set of EM elements 125. In some embodiments, the data received from the first EM element 125 is associated with an operation of the fixture 107. For example, as illustrated in FIG. 7, the fixtures 107 (the EM elements 125 thereof) transmit fixture data to the end point devices 105. From 604, the process 600 proceeds to 606.

At 606, the data is converted pursuant to a networking protocol. In some embodiments, the data is converted pursuant to specific networking protocol consistent with a network connection between the end point device 105 and the facility device 110. As one example, in some embodiments, the data is converted pursuant to LoRa networking protocols for transmission over a LoRa connection between the end point device 105 and the facility device 110. From 606, the process 600 proceeds to 608.

At 608, the data is transmitted for remote or virtual processing. In some embodiments, the converted data is transmitted for virtual processing over a network associated with the networking protocol. In some embodiments, as described above, the data is transmitted to the facility device 110 (as a gateway device). For example, as illustrated in FIG. 7, the end point devices 105 transmit the converted fixture data to the facility device 110. In some embodiments, the end point device 105 maintains a backlog of data packets (e.g., the converted data) until a connection to, for example, the facility device 110 is available (e.g., in the event that a connection to the facility device 110 is temporarily unavailable). In some embodiments, the facility device 110 forwards the data to a remote device, server, or database for virtual processing in the cloud, such as, for example, the server 115, the user device 120, or a combination thereof (as seen in FIG. 7). From 608, the process 600 ends.

Generally, process 620 is employed to determine a chemistry of a battery. At 622, an initial voltage of the battery is recorded based on a current voltage of the battery. From 622, the process 620 proceeds to 624.

At 624, a first chemistry for the battery is assigned based on the initial voltage. From 624, the process 620 proceeds to 626.

At 626, a first voltage difference of the battery is determined when the current voltage of the battery meets a first threshold. From 626, the process 620 proceeds to 628.

At 628, a second voltage difference of the battery is determined when the current voltage of the battery meets a second threshold. In some embodiments, the first voltage difference and the second voltage difference are determined during a power up of the fixture or when the fixture is idle. From 628, the process 620 proceeds to 630.

At 630, a second chemistry for the battery is assigned based on the first voltage difference, the second voltage difference, and a measure of the current voltage of the battery when meeting the second threshold. In some embodiments, the second chemistry is assigned for the battery when the first voltage difference is less than between 130 mV and 170 mV, the second voltage difference is less than between 280 mV and 320 mV, and the measure of the current voltage of the battery when meeting the second threshold is greater than between 5450 mV and 5550 mV. In some embodiments, the first chemistry for the battery is alkaline and the second chemistry for the battery is lithium. In some embodiments, a second chemistry of a secondary battery is determined according to the steps of the process 620. In some embodiments, the secondary battery is housed in an attached fixture. From 630, the process 620 proceeds to 632.

At 632, a battery status determined based on the second chemistry for the battery is provided to a remote device via a communication interface. In some embodiments, a battery indicator is configured to display an indication of the battery status and the battery status is provided to the battery indicator. In some embodiments, when a communication link between the remote device and the communication interface is inoperable, the communication link is restored via attempts determined according to an exponentially increasing algorithm. From 632, the process 620 ends.

Generally, process 640 is employed to measure, as a battery status, a voltage of a battery at a known condition of the battery. At 642, a time of a high-load event that includes the use of electric power provided by the battery is recorded. In some embodiments, the high-load event includes an activation of an EM element. In some embodiments, the activation of the EM element is based on an activation command received by the communication interface from a remote device. In some embodiments, the known condition is the battery under no-load. From 642, the process 640 proceeds to 644.

At 644, whether the battery is in a recovery state is determined, based on an initiation of a battery condition check, by comparing a current time value to the recorded time of the high-load event. In some embodiments, the battery condition check is initiated based on a timer. In some embodiments, the timer is asynchronous to the high-load event. In some embodiments, the recovery state comprises a current voltage of the battery returning to a voltage of the battery at no-load. In some embodiments, the battery condition check is rescheduled when the battery is in the recovery state. From 644, the process 640 proceeds to 646.

At 646, the battery status is measured when the battery is not in the recovery state. In some embodiments, a secondary voltage of a secondary battery at a second known condition is measured as a secondary battery status according to the steps of the process 640. In some embodiments, the secondary battery is housed in an attached fixture. From 646, the process 640 proceeds to 648.

At 648, the battery status is provided to the remote device via a communication interface. In some embodiments, the battery status is provided to a battery indicator configured to display an indication of the battery status. In some embodiments, when a communication link between the remote device and the communication interface is inoperable, the communication link is restored via attempts determined according to an exponentially increasing algorithm. From 648, the process 640 ends.

Generally, process 660 is employed to measure a battery status during a high-current pulse load. At 662, an event causing the high-current pulse load on a battery is executed. In some embodiments, the event is received from a remote device via a communication interface. In some embodiments, the event is executed based on a timer. In some embodiments, the high-current pulse load is at least ten times a normal pulse load of the battery. In some embodiments, the high-current pulse load is at least fifty times the normal pulse load of the battery. From 662, the process 660 proceeds to 664.

At 664, a voltage of the battery for a duration of the event is continuously recorded at a defined interval. In some embodiments, the voltage is continuously record via a measurement averaging system of an analog-to-digital converter. In some embodiments, the defined interval is a sub-fraction of a duration of the high-current pulse load on the battery. In some embodiments, the defined interval is 0.5 milliseconds (mS) to 2 mS. From 664, the process 660 proceeds to 666.

At 666, the battery status is determined based on a lowest voltage reading during the event. In some embodiments, the battery status provides an indicator for a charge state of the battery. In some embodiments, the battery status includes an internal impedance of the battery. In some embodiments, a secondary battery status is measured during a second high-current pulse load for a secondary battery according to the steps of the process 660. In some embodiments, the secondary battery is housed in an attached fixture. From 666, the process 660 proceeds to 668.

At 668, the battery status is provided to the remote device via the communication interface. In some embodiments, when a communication link between the remote device and the communication interface is inoperable, the communication link is restored via attempts determined according to an exponentially increasing algorithm. From 668, the process 660 ends.

Generally, process 680 is employed to optimize download efficiency for an IoT enabled fixture. At 682, a file is received from a remote device via a communication interface. The file includes a plurality of data blocks. In some embodiments, each of the plurality of data blocks includes a unique CRC value and a payload. In some embodiments, each of the plurality of data blocks is assigned a block number for identification and sequencing. In some embodiments, the plurality of data blocks comprises a firmware update or a data file. In some embodiments, each of the CRC values and each of the check values are based on a remainder of the polynomial division of the respective payload. In some embodiments, the file is received form the remote device through a LoRa messaging protocol via an OTA data transfer. In some embodiments, the file includes operating firmware. In some embodiments, the file includes an update to at least one setting. In some embodiments, the update includes data for cloud purge scheduling. From 682, the process 680 proceeds to 684.

At 684, a check value is determined for each of the plurality of data blocks based on a polynomial division of the respective payload. From 684, the process 680 proceeds to 686.

At 686, an error in at least one of the plurality of data blocks is determined based on a comparison between each of the respective CRC values and the respective check values. From 686, the process 680 proceeds to 688.

At 688, a request for retransmission of each of the at least one of the plurality of data blocks with the determined error is provided to the remote device via the communication interface. In some embodiments, the requests are provided via the communication interface to the remote device over a wireless protocol. In some embodiments, a size of the of each of the plurality of data blocks is determined according to a data packet size limit for the wireless protocol. In some embodiments, the requests are sent in an order that does not correspond to the order the plurality of data blocks. In some embodiments, when a communication link between the remote device and the communication interface is inoperable, the communication link is restored via attempts determined according to an exponentially increasing algorithm. In some embodiments, a replacement data block for each the plurality of data blocks that were requested for retransmission is received from the remote device via the communication interface. In some embodiments, after a reset event, receive, via the communication interface, a status of a network interface. In some embodiments, the status includes whether the network interface is connected to the remote device. In some embodiments, the reset event is an event that includes power being cycled to the fixture or processor (e.g., turn off and then turn back on). In some embodiments, the reset event is an event where the fixture or processor loses power and then restarts once power is restored. In some embodiments, the network interface is a WAN radio modem or a cellular network mode. From 688, the process 680 ends.

Generally, process 690 is employed to recover from a disruption during an OTA data transfer. At 692, the OTA data transfer is initiated with the remote device via the communication interface. In alternative embodiments, the OTA data transfer is initiated by the remote device. From 692, the process 690 proceeds to 694.

At 694, a plurality of data packets is received from the remote device. In some embodiments, the plurality of data packets is received form the remote device through a LoRa messaging protocol via the OTA data transfer. In some embodiments, the plurality of data packets comprises an update to firmware. In some embodiments, the plurality of data packets comprises an update to at least one setting. In some embodiments, the update includes data for cloud purge scheduling. From 694, the process 690 proceeds to 696.

At 696, each of the plurality of data packets is persisted to the non-volatile memory as each of the plurality of data packets is received. From 696, the process 690 proceeds to 698.

At 698, a progress of the OTA data transfer is determined, after a reset, by reading the plurality of data packets from the non-volatile memory. In some embodiments, the progress of the OTA data transfer is determined during a boot sequence. In some embodiments, the reset is caused by a loss of power. In some embodiments, the plurality of data packets is cleared from the non-volatile memory on completion of the OTA data transfer. From 698, the process 690 proceeds to 699.

At 699, a request for resumption of the OTA data transfer is provided to the remote device based on the progress. In some embodiments, when a communication link between the remote device and the communication interface is inoperable, the communication link is restored via attempts determined according to an exponentially increasing algorithm. In some embodiments, a request for cancelation of the OTA data transfer is provided to the remote device after a set number of failed attempts. From 699, the process 690 ends.

Examples

As one example, a user may use the user device 120 (or another remote device) to access and interact with the data. The user may view and interact with usage patterns, which may allow a facility entity or maintainer insights into, for example, how to optimize cleaning and maintenance schedules (for example, for preventative or predicted maintenance), whether there is a need for additional facilities, end point devices, or a combination thereof, and the like. As noted above, in some embodiments, the server 115 is configured to monitoring and managing one or more facilities, including the fixtures 107 therein. In some embodiments, the server 115 is configured to receive fixture data from the facility device 110 and determine, based on the received fixture data usage information or patterns associated with the one or more facilities, including the fixtures 107 thereof. Alternatively or in addition, in some embodiments, the server 115 monitors a battery characteristics (e.g., power level or condition) associated with the end point device 105.

As yet another example, where the fixture 107 is a faucet, the server 115 may analyze the fixture data to monitor the communications between the EM elements 125 of a fixture 107 (for example, a sensor and an actuator) to track, among other things, the number of "ON" and "OFF" signals (or activations). Alternatively or in addition, the server 115 may analyze the fixture data to detect the flow of water by monitoring temperature data from a temperature sensor (as an EM element 125 of the fixture 107) either positioned within the drain or the faucet itself. Alternatively or in addition, the server 115 may analyze the fixture data to determine when a run-on condition has occurred in response to determine that a predetermined period of time set by a user is exceeded and the faucet did not return to an "OFF" condition or water flow is still detected. Alternatively or in addition, the server 115 may analyze the fixture data to calculate water usage indirectly based at least in part on a duration of time that the valve of the faucet remains open and an estimated water flow rate.

As yet another example, where the fixture 107 is a flush valve, the server 115 may analyze the fixture data to monitor a magnitude of a voltage and/or current supplied to the EM element 125 (for example, an actuator) of the fixture 107 to track when a flushing event has been initiated. Alternatively or in addition, the server 115 may analyze the fixture data to determine when an "ON" signal is provided (for example, a person is detected) but no corresponding movement of the valve occurs. In such instances, the server 115 may generate and provide an error signal such that an alert may be generated via, for example, the facility device 110, the user device 120, another component of the system 100, or a combination thereof. Such faults may be detected by detecting an elevated voltage or current rate (for example, motor is bound). Alternatively or in addition, the server 115 may analyze the fixture data to determine a length of time a person is detected using the fixture 107 on any given instance.

As yet another example, where the fixture 107 is a resource dispenser, the server 115 may analyze the fixture data to monitor a magnitude of a voltage and/or current supplied to an EM element 125 (for example, an actuator) of a fixture 107 to track when a resource dispensing event has occurred. Alternatively or in addition, the server 115 may analyze the fixture data to monitor a level or amount of resource remaining in a reservoir of the fixture 107. The server 115 may calculate an amount of resource remaining in a reservoir of the fixture 107 by subtracting a predetermined volume or amount of resource discharged during a resource dispensing event for each detected activation. In some embodiments, when the server 115 determines that a level or amount of resource remaining in a reservoir of the fixture 107 has fallen below a predetermined amount or level, the server 115 may generate and provide an error signal such that an alert may be generated via, for example, the facility device 110, the user device 120, another component of the system 100, or a combination thereof.

Additionally, in some embodiments, the battery life (for example, an energy level or energy usage) may be monitored using various indicators, such as a graphical representation of a fuel gauge. Alternatively or in addition, in some embodiments, the server 115 (an electronic processor thereof) may generate alerts and warnings in response to detecting a predetermined energy level, where the predetermined energy level indicates an end of battery life scenario, an energy source replacement scenario, and the like. As one example, when the electronic processor of the server 115 detects a predetermined energy level indicating a low energy level, the electronic processor of the server 115 may generate and transmit a low energy level alert to a user of the user device 120 (via, for example, a display device of the user device 120).

Non-Transitory Computer Readable Storage Medium

In some embodiments, the platforms, systems, media, and methods disclosed herein include one or more non-transitory computer readable storage media encoded with a program including instructions executable by the operating system of an optionally networked computer. In further embodiments, a computer readable storage medium is a tangible component of a computer. In still further embodiments, a computer readable storage medium is optionally removable from a computer. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the computer's CPU, written to perform a specified task. Computer readable instructions may be implemented as program modules, such as functions, objects, API, data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and eXtensible Markup Language (XML) database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or XML. In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile computer. In some embodiments, the mobile application is provided to a mobile computer at the time it is manufactured. In other embodiments, the mobile application is provided to a mobile computer via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Data Stores

In some embodiments, the platforms, systems, media, and methods disclosed herein include one or more data stores. In view of the disclosure provided herein, those of skill in the art will recognize that data stores are repositories for persistently storing and managing collections of data. Types of data stores repositories include, for example, databases and simpler store types, or use of the same. Simpler store types include files, emails, and the like. In some embodiments, a database is a series of bytes that is managed by a DBMS. Many databases are suitable for receiving various types of data, such as weather, maritime, environmental, civil, governmental, or military data. In various embodiments, suitable databases include, by way of non-limiting examples, relational databases, non-relational databases, object-oriented databases, object databases, entity-relationship model databases, associative databases, and XML databases. Further non-limiting examples include SQL, PostgreSQL, MySQL, Oracle, DB2, and Sybase. In some embodiments, a database is internet-based. In some embodiments, a database is web-based. In some embodiments, a database is cloud computing based. In some embodiments, a database is based on one or more local computer storage devices.

While preferred embodiments of the present disclosure have been shown and described herein, it will be obvious to those skilled in the art that such embodiments are provided by way of example only. Numerous variations, changes, and substitutions will now occur to those skilled in the art without departing from the described system. It should be understood that various alternatives to the embodiments described herein may be employed in practicing the described system.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Moreover, the separation or integration of various system modules and components in the implementations described earlier should not be understood as requiring such separation or integration in all implementations, and it should be understood that the described components and systems can generally be integrated together in a single product or packaged into multiple products. Accordingly, the earlier description of example embodiments does not define or constrain this disclosure. Other changes, substitutions, and alterations are also possible without departing from the spirit and scope of this disclosure.

Thus, the invention provides, among other things, systems for determining a chemistry of a battery in a fixture, measuring a voltage of the battery at a known condition of the battery, measuring a battery status during a high-current pulse load, optimizing download efficiency, and recovering from a disruption during an OTA data transfer. Various features and advantages of the invention are set forth in the following claims.

What is claimed is:

1. A fixture comprising:
a communication interface;
a non-volatile memory; and
a processor configured to recover from a disruption during an over the air (OTA) data transfer by:
initiating the OTA data transfer with a remote device via the communication interface;
receiving from the remote device a plurality of data packets;
persisting each of the plurality of data packets to the non-volatile memory as each of the plurality of data packets is received;
determining, after a reset of the processor, a progress of the OTA data transfer by reading the plurality of data packets from the non-volatile memory; and
providing, to the remote device, a request for resumption of the OTA data transfer based on the progress.

2. The fixture of claim 1, wherein the progress of the OTA data transfer is determined during a boot sequence.

3. The fixture of claim 1, wherein the reset of the processor is caused by a loss of power.

4. The fixture of claim 1, wherein the processor is further configured to: provide, to the remote device, a request for cancelation of the OTA data transfer after a set number of failed attempts.

5. The fixture of claim 1, wherein the processor is further configured to: clear the plurality of data packets from the non-volatile memory on completion of the OTA data transfer.

6. The fixture of claim 1, wherein the plurality of data packets is received form the remote device through a Long Range (LoRa) messaging protocol via the OTA data transfer.

7. The fixture of claim 1, wherein the plurality of data packets comprises an update to firmware.

8. The fixture of claim 1, wherein the plurality of data packets comprises an update to at least one setting.

9. The fixture of claim 8, wherein the update includes data for cloud purge scheduling.

10. The fixture of claim 1, wherein the processor is further configured to: when a communication link between the remote device and the communication interface is inoperable, attempt to restore the communication link according to an exponentially increasing algorithm.

11. A computer implemented method for recovering from a disruption during an over the air (OTA) data transfer, the method executed by a processor and comprising:
initiating the OTA data transfer with a remote device via a communication interface; receiving from the remote device a plurality of data packets;
persisting each of the plurality of data packets to a non-volatile memory as each of the plurality of data packets is received;
determining, after a reset of the processor, a progress of the OTA data transfer by reading the plurality of data packets from the non-volatile memory; and
providing, to the remote device, a request for resumption of the OTA data transfer based on the progress.

12. The method of claim 11, wherein the progress of the OTA data transfer is determined during a boot sequence.

* * * * *